United States Patent [19]
Newland et al.

[11] Patent Number: 4,948,309
[45] Date of Patent: Aug. 14, 1990

[54] CLAMPING MEANS FOR MACHINE TOOL HOLDERS

[75] Inventors: Paul W. Newland; Anthony Kornilov, both of Warren; Walter H. Kelm, Mt. Clemens, all of Mich.

[73] Assignee: Carboloy Inc., Warren, Mich.

[21] Appl. No.: 405,141

[22] Filed: Sep. 7, 1989

[51] Int. Cl.⁵ ................................................ B23C 5/26
[52] U.S. Cl. ...................................... 409/234; 82/160; 279/97; 403/324; 409/232
[58] Field of Search ............... 409/232, 234, 231, 233; 82/160; 279/1 TX, 86, 97, 103; 403/324

[56] References Cited
U.S. PATENT DOCUMENTS

| | | | |
|---|---|---|---|
| 2,485,799 | 10/1949 | Woytych | 279/103 X |
| 4,723,878 | 2/1988 | Kelm et al. | 409/234 |
| 4,729,702 | 3/1988 | Kelm | 409/234 |

Primary Examiner—Steven C. Bishop
Attorney, Agent, or Firm—Burns, Doane, Swecker & Mathis

[57] ABSTRACT

A clamping device for releasably securing a tooling adaptor in a tool clamp block comprising a generally cylindrical member having an eccentric slot for engaging and securing the tooling adaptor, the cylindrical member adapted to move in the direction of its longitudinal axis to reversibly load and engage the tooling adaptor.

14 Claims, 3 Drawing Sheets

CLAMPING MEANS FOR MACHINE TOOL HOLDERS

FIELD OF THE INVENTION

The present invention relates generally to tool clamping devices and particularly to devices for securing and clamping tooling adaptors to tool clamp blocks.

BACKGROUND OF THE INVENTION

In the machine tool industry, and particularly in automated systems, it is necessary to use a variety of machine tools to perform specific machining operations on a single work piece. Repeated changing of work tools results in a considerable amount of downtime in the operation of the machine and consequently a loss of production time.

The replacement of a tool holder in a tool clamp block or spindle is ordinarily a manual operation, time consuming, laborious, and somewhat imprecise thereby requiring certain adjustments after replacement. If the replacement operation is automatic or semi-automatic, the mechanical strength requirements of the tool holder mechanism leads to the need for complex and powerful changing mechanisms usually based on hydraulic principles, especially to unclamp the tool holder.

One effort to simplify construction of such clamping devices is disclosed in Walter Kelm et al., U.S. Pat. No. 4,723,878. A cylindrical member is provided with an eccentric slot for receiving and securing a tooling adaptor therein. The retention knob at the end of the tooling adaptor is inserted into a loading area and the clamping device is rotated to permit the retention knob to enter a helical engaging area wherein the retention knob is drawn into and secured within the eccentric slot.

The aforementioned clamping device is a significant improvement over more cumbersome, less automated and more expensive devices. However, because it requires rotary motion to engage the tooling adaptor, a motor or similar mechanism must be used to rotate the cylindrical member. It would be beneficial to be able to secure the tooling adaptor within the eccentric slot without having to employ a device for rotating the cylindrical member.

It is therefore an object of the present invention to provide a clamping device which easily loads and secures a tooling adaptor to a tool clamp block.

It is another object of the present invention to provide a clamping device for securing a tooling adaptor to a tool clamp block in which the clamping device is not rotated.

It is still another object of the invention to provide a clamping device in which loading and securing of the tooling adaptor takes place with minimum material resistance.

SUMMARY OF THE INVENTION

The present invention is directed to a clamping mechanism for releasably securing a tooling adaptor in a tool clamp block. The mechanism comprises a generally cylindrical member having an eccentric slot formed in the direction of the longitudinal axis of the cylindrical member and means for engaging the tooling adaptor in the eccentric slot. Means are also provided for reciprocally moving the cylindrical member in the direction of the longitudinal axis so that the tooling adaptor can be engaged and drawn into and secured within the tool clamp block and easily released therefrom.

The cylindrical member is housed within a bore of the tool clamp block. The bore contains an opening common to an opening of a second bore which houses the tooling adaptor. The tooling adaptor extends into the first bore a sufficient distance so as to engage the eccentric slot of the cylindrical member within the first bore.

The positioning of the first bore and the second bore within the tool clamp block insures proper engagement between the cylindrical member and the tooling adaptor. The longitudinal axis of the first bore is set an an angle with respect to the longitudinal axis of the second bore of from about 70° to about 110°, preferably in the range of from about 84° to 96°, most preferably about 86° or 94°. The longitudinal axis of the first bore may also be positioned at a 90° angle with respect to the second bore. It is preferred that the longitudinal axes of the first and second bores be in a common plane to insure that the tooling adaptor may be readily loaded and engaged within the eccentric slot.

The cylindrical member has an eccentric slot having a loading zone and an engaging zone. The loading zone is adapted to initially receive the end of the tooling adaptor having a retention knob thereon and the engaging zone has shoulders which retain and secure the tooling adaptor in the eccentric slot by gripping the retention knob.

To secure a tooling adaptor in the tool clamp block according to the present invention the clamping mechanism is inserted into the cylindrical bore of the tool clamp block and set at a start or load position. A tooling adaptor is then inserted into the other bore of the tool clamp block to a point where the retention knob, either integral with or removably affixed to the inserted end of the tooling adaptor, enters the loading zone of the eccentric slot of the cylindrical member. The cylindrical member is then moved in the direction of the longitudinal axis of the cylindrical bore of the tool clamp block to displace the retention knob along with the tooling adaptor, inwardly, preferably at a constant angle, toward the center of the clamping mechanism thereby wedgingly securing the tooling adaptor in the bore of the tool clamp block.

When it becomes necessary to replace the tooling adaptor, the clamping mechanism is reversibly moved to the start or load position to effect a displacement of the tooling adaptor in the opposite direction. The tooling adaptor is then removed from the tool clamp block, either manually or automatically, a replacement adaptor is inserted into the tool clamp block and the locking procedure is repeated again.

BRIEF DESCRIPTION OF THE DRAWINGS

The following drawings in which like reference characters indicate like parts are illustrative of embodiments of the invention and are not meant to limit the invention encompassed by the claims forming part of the application.

DETAILED DESCRIPTION OF THE INVENTION

Figure 1:
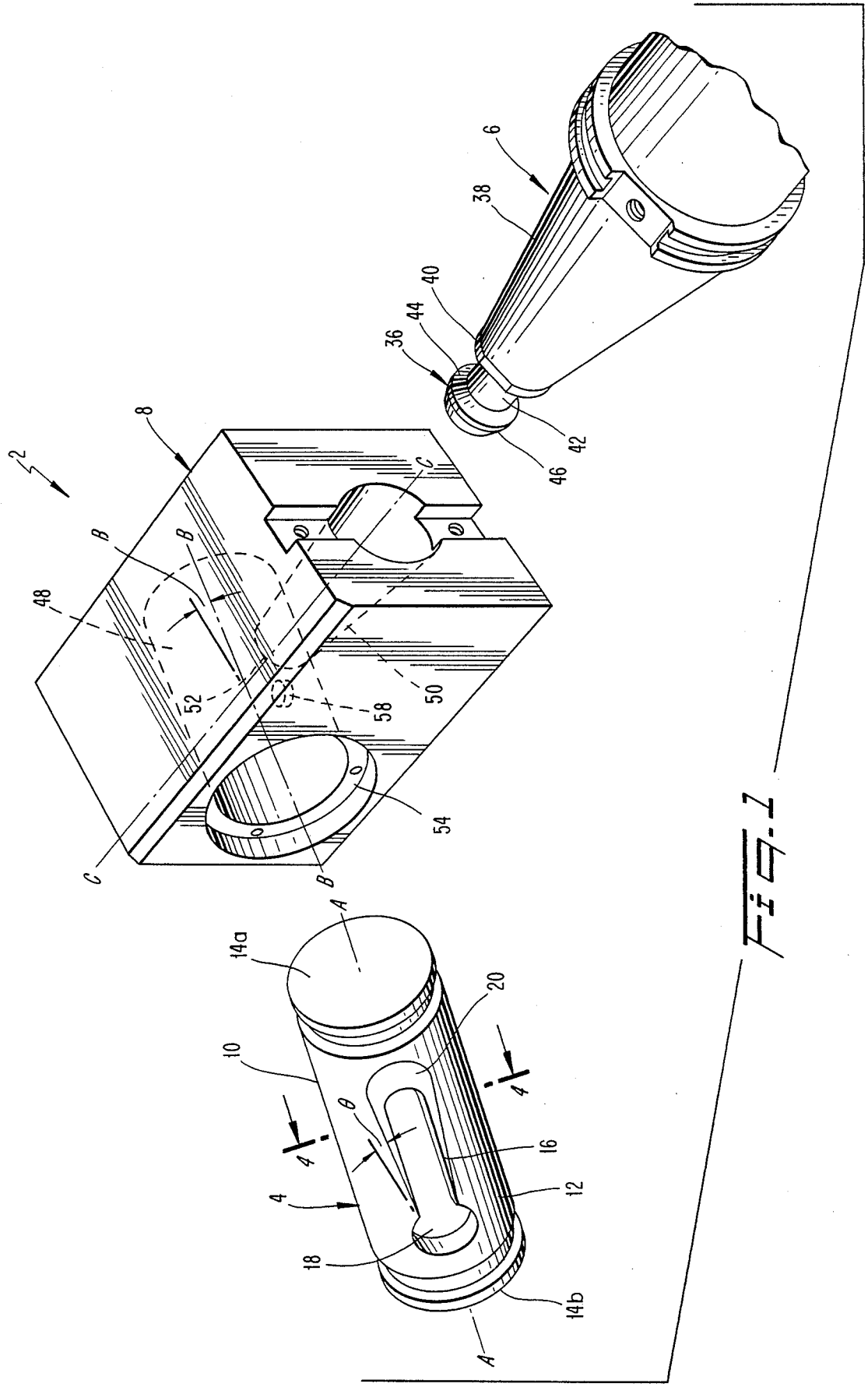
FIG. 1 is an exploded view of one embodiment of the clamping mechanism of the present invention.

Referring to the drawings and particularly to FIG. 1, there is shown a clamping mechanism 2 including a substantially cylindrical locking member 4 for securing a tooling adaptor 6 in a tool clamp block 8.

The cylindrical member 4 includes a body 10 having an outside surface 12 and opposed ends 14a and 14b. An eccentric slot 16 extends in the direction of the longitudinal axis A—A of the cylindrical member 4. The eccentric slot 16 includes an enlarged, substantially circular loading zone 18 of sufficient size to accept a retention knob affixed to the end of the tooling adaptor 6.

Figure 4:
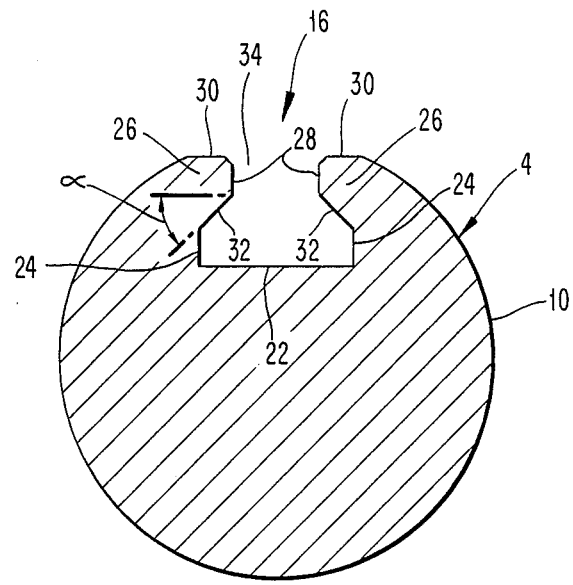
FIG. 4 is a cross-sectional view of the cylindrical member of FIG. 1 taken along line 4—4.

Adjacent the loading zone 18 is a zone 20 for engaging and securing the tooling adaptor 6 within the eccentric slot 16. As best shown in FIG. 4, the eccentric slot 16 includes an inner wall 22, a pair of opposing walls 24 and a pair of opposing shoulders 26. Each of the shoulders 26 includes a top surface 28, an essentially vertical wall 30 extending from the top surface 28 and a tapered wall 32 extending downwardly and outwardly from the top surface 28 to the opposing wall 24. An opening 34 to the eccentric slot 16, is provided on the outside surface 12. The angle $\alpha$ of the tapered walls 32 can vary from about 0° to less than 90° depending upon the particular retention knob employed on the tooling adaptor 6. The angle $\alpha$ is preferably in the range of from about 10° to about 45°.

Figure 3:
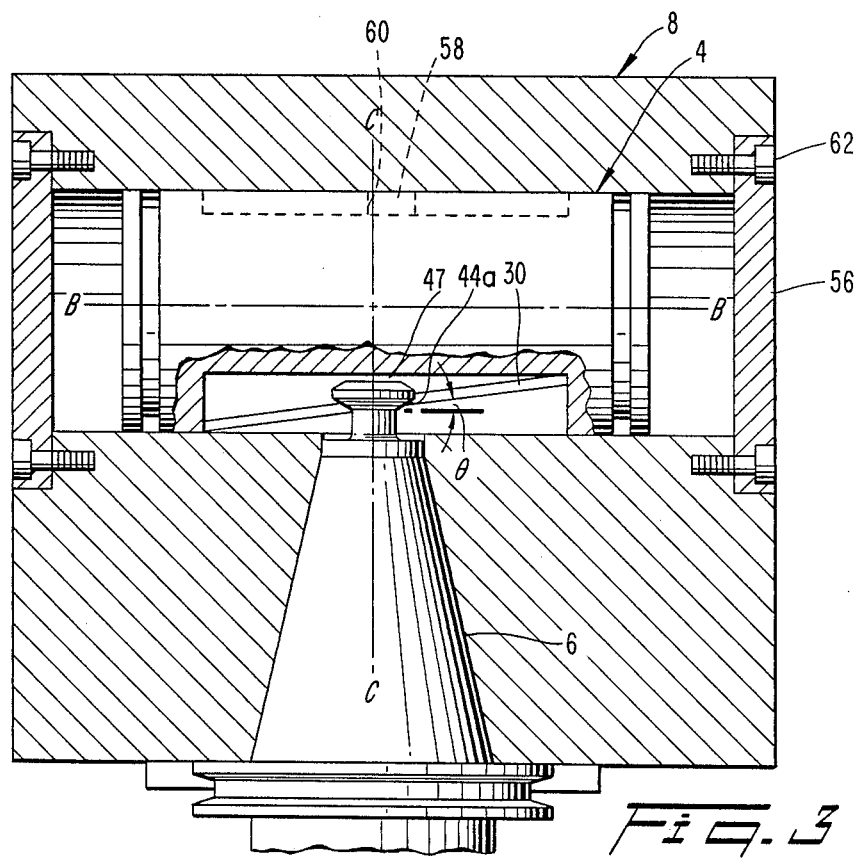
FIG. 3 is a cross-sectional view of a tool clamp block containing the cylindrical member within a bore having a longitudinal axis perpendicular to the longitudinal axis of the bore housing the tooling adaptor.

The tapered walls 32 not only taper by an angle $\alpha$ as shown best in FIG. 4, they also taper inwardly in the direction of the longitudinal axis A—A as shown best in FIGS. 1 and 3. The degree of taper $\theta$ is in the range of up to about 20°, preferably from about 2° to about 6°, most preferably about 4°. Thus the tapered walls 32 function as a gripping surface for drawing the tooling adaptor 6 inwardly until it is securely fastened within the eccentric slot 16. The degree of taper $\theta$ is preferably constant along the length of the eccentric slot 16.

The tooling adaptor 6 is provided with a retention knob 36 which may be integral with or removably insertable into the tapered end 38 of the tooling adaptor 6. The retention knob 36 includes a shoulder 40, a neck 42, a conical gripping surface 44 and a tip 46. The conical gripping surface 44 tapers downwardly and outwardly from the neck 42 to the tip 46 at an angle corresponding to the angle $\alpha$ of the tapered walls 32 of the eccentric slot 16. The angle $\alpha$ may be in the range of about 0° up to less than about 90°, preferably from about 10° to about 45°. The angular mating of the conical gripping surface 44 of the retention knob 36 and the tapered walls 32 of the eccentric slot 16 provides area contact between the clamping mechanism 2 and the tooling adaptor 6 for drawing in and securing the tooling adaptor 6 in the tool clamp block 8. A gap or clearance area 47 is maintained between the tip 46 of the retention knob 36 and the inner wall 22 of the eccentric slot 16 when the retention knob 36 is in the engagement zone 20. The gap 47 minimizes resistance to movement of the retention knob 36. As the retention knob 36 is moved from engagement zone 20 to the loading zone 18, the width of the gap 47 narrows until the tip 46 contacts the inner wall 22 which assists in ejecting the retention knob 36 from the loading zone 18.

The tool clamp block 8 includes a first bore 48 adapted to receive the cylindrical member 4 therein and a second bore 50 adapted to receive the tooling adaptor 6 therein. The bores 48 and 50 have a common opening 52 which enables the retention knob 36 to extend into the first bore 48 and enter the eccentric slot 16. The first bore 48 has a pair of opposed counterbores 54 (only one is shown) for securing respective covers 56 as shown, for example, in FIG. 2, and explained hereinafter.

Figure 2:
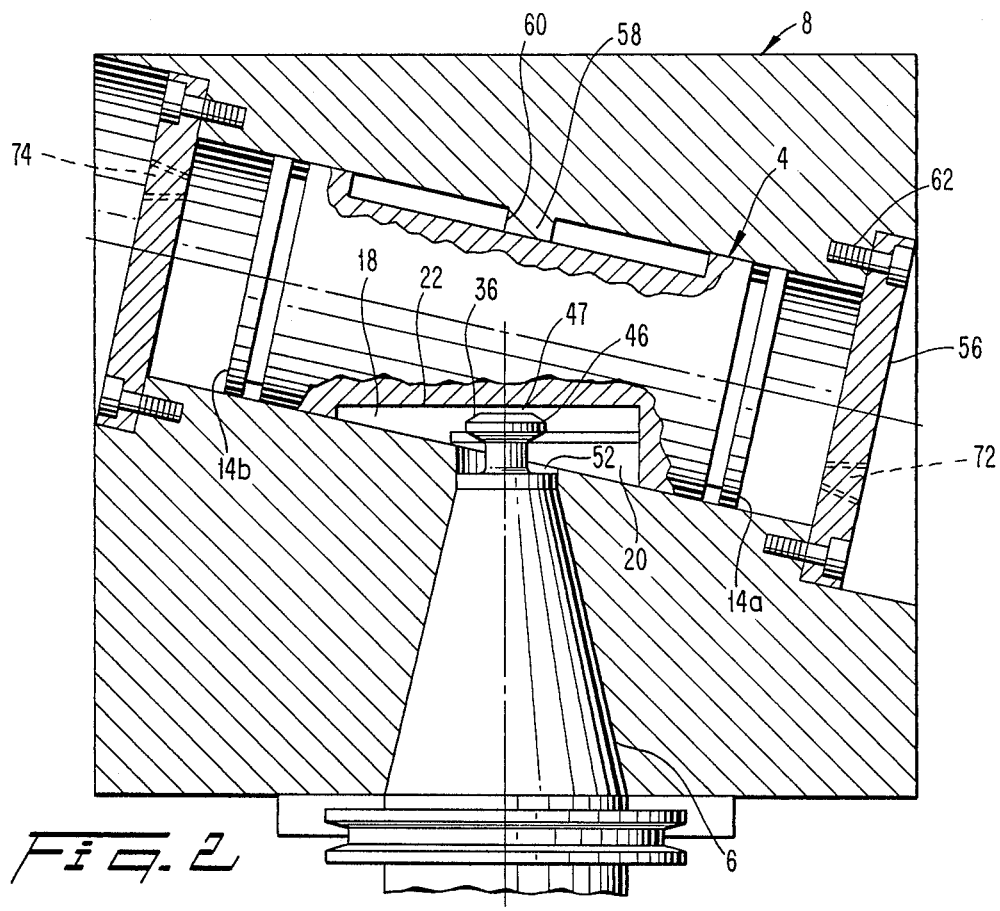
FIG. 2 is a cross-sectional view of a tool clamp block containing a cylindrical member and a tooling adaptor secured therein, wherein the longitudinal axis of the bore housing the cylindrical member is not perpendicular to the longitudinal axis of the bore housing the tooling adaptor.

In a preferred embodiment of the invention as shown best in FIGS. 1 and 2, the longitudinal axis B—B of the first bore 48 is not perpendicular to the longitudinal axis C—C of the second bore 50. In particular as shown in FIG. 1, the longitudinal axis B—B of the first bore 48 is offset from the perpendicular by an angle $\beta$ corresponding to the angle of taper $\theta$ of the tapered walls 32 of the eccentric slot 16. As a result, the longitudinal axis C—C of the second bore 50 is essentially perpendicular to the tapered walls 32 of the eccentric slot 16 when the cylindrical member 4 is secured in the tool clamp block 8. This embodiment is preferred because frictional forces are the only resistance to loading of the tooling adaptor 6 since material resistance is essentially inconsequential. Thus, as shown in FIG. 2, when the retention knob 36 of the tooling adaptor 6 is moved from the loading zone 18 into the engaging zone 20, the only resistance is the friction generated between the tapered walls 32 of the eccentric slot 16 and the conical gripping surface 44 of the retention knob 36.

In another embodiment of the invention, as shown in FIG. 3, the longitudinal axis B—B of the first bore 48 is perpendicular to the longitudinal axis C—C of the second bore 50. As a result the tapered walls 32 of the eccentric slot 16 are offset from the perpendicular of the longitudinal axis C—C of the second bore 50 by the angle $\theta$.

In this embodiment the forward conical gripping surface 44a of the retention knob 36 is subject to both frictional and material resistance which makes engagement of the tooling adaptor 6 by the cylindrical member 4 somewhat more difficult.

It is desirable to insure that the cylindrical member 4 does not rotate within the first bore 48. Various well-known modifications to the cylindrical member 4 and/or the first bore 48 can be made to achieve this result. By way of illustration and as shown specifically in FIGS. 1 and 2, the surface of the first bore 48 may be provided with a projection 58 which extends into a slot 60 on the surface of the cylindrical member 4, preferably opposite to the location of the eccentric slot 16. The cylindrical member 4 is housed within the first bore 48 by the cover 56 which rests in corresponding counterbores 54 and is secured therein by screws or bolts 62. The cover 56 operates as a stop to prevent further lateral movement of the cylindrical member 4 during the loading and engaging operations.

In operation, the cylindrical member 4 is loaded first into its corresponding bore 48 to a position where the loading zone 18 is aligned with the common opening 52 between the first bore 48 and the second bore 50. The tooling adaptor 6 is then inserted into the second bore 50 so that the retention knob 36 enters the loading zone 18 of the cylindrical member 4. The covers 56 are then secured in the counterbores 54.

Movement of the cylindrical member 4 may be accomplished by a standard hydraulic circuit (not shown) wherein hydraulic fluid is forced against the appropriate end 14 of the cylindrical member 4. The retention knob 36 which was inserted in the loading zone 18 enters the engaging zone 20 as the cylindrical member 4 is caused to move laterally by the force of hydraulic fluid against side 14a through port 72 or by removing the force applied to side 14b by evacuating hydraulic fluid through port 74.

When it becomes necessary to release the tooling adaptor 6 from the tool clamp block 8, the cylindrical member 4 is moved laterally to the right in accordance with the scheme shown in FIG. 1. The retention knob 36 accordingly moves from the engaging zone 20 to the loading zone 18 where the tooling adaptor 6 can be readily removed from the eccentric slot 16 and out of the second bore 50 assisted by contact between the tip 46 of the retention knob 36 and the inner wall 22 of the cylindrical member 4. Movement of the cylindrical member 4 may be carried out as described previously. For example, pressure may be applied to side 14b or the pressure reduced against side 14a. Lateral movement of the cylindrical member 4 beyond the loading and securing positions is prevented by the covers 56.

Figure 5:
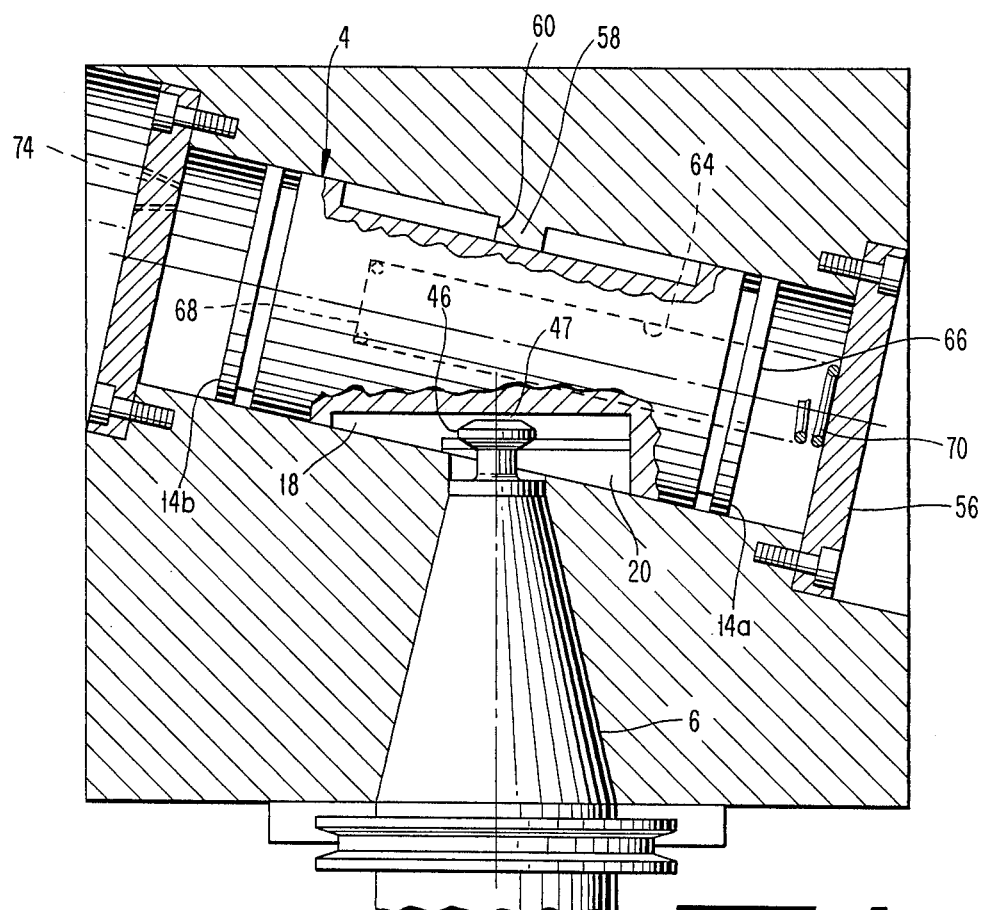
FIG. 5 is cross-sectional view of a tool clamp block containing a cylindrical member which houses a spring for moving the cylindrical member within the bore from the loading to the engaging position.

The cylindrical member 4 may be modified to accommodate a resilient means to assist in moving the cylindrical member 4 within the tool clamp block 8. As shown in FIG. 5, the cylindrical member is provided with a cavity 64 having an opening 66 in one of the ends 14 (end 14a as shown in FIG. 5) of the cylindrical member 4 and a closed end 68. A resilient means such as a coiled spring means 70 is inserted into the cavity 64 when the cylindrical member 4 is loaded within the first bore 48. The spring means 70 is prevented from lateral movement and retained in a compressed state by the cover 56 which abuts against the side 14a of the cylindrical member 4 and by hydraulic fluid forced against side 14b. In this position the retention knob 36 is in the loading zone 18.

When the hydraulic fluid is released through port 74 thereby releasing pressure against side 14b, the spring means 70 uncoils forcing the cylindrical member 4 to move laterally to the left so that the retention knob 36 enters the engaging zone 20. An opposite sequence is employed to move the cylindrical member 4 to the right so that the retention knob 36 moves into the loading zone 18 enabling the tooling adaptor 6 to be released from the tool clamp block 8. Other modifications and methods for moving the cylindrical member laterally is within the skill of the art and within the scope of the present invention.

What we claim is:

1. A clamping mechanism for releasably securing a tooling adaptor in a tool clamp block comprising:
a generally cylindrical member having a longitudinal axis and an eccentric slot formed in the direction of said longitudinal axis and including means for engaging the tooling adaptor in said cylindrical member; and means for moving the cylindrical member in the direction of said longitudinal axis whereby the tooling adaptor is drawn into and secured within the tool clamp block.

2. The clamping mechanism of claim 1 wherein the tool clamp block has a first bore adapted to receive said cylindrical member, said first bore being adjacent to a second bore in the tool clamp block adapted to receive the tooling adaptor, wherein the tooling adaptor is inserted in said second bore to a point where the tooling adaptor engages the eccentric slot in said cylindrical member and wherein said cylindrical member is moved in the direction of said longitudinal axis to draw in and secure the tooling adaptor within the second bore of the tool clamp block.

3. The clamping mechanism of claim 2 wherein the longitudinal axis of the first bore of the tool clamp block and the longitudinal axis of the second bore of the tool clamp block form an angle of from about 70° to about 110°.

4. The clamping mechanism of claim 3 wherein said angle is from about 84° to 96°.

5. The clamping mechanism of claim 4 wherein said angle is selected from the group consisting of 86° and 94°.

6. The clamping mechanism of claim 2 wherein said eccentric slot comprises a loading zone and an engaging zone wherein said loading zone comprises a flat region for receiving a retention knob affixed to one end of the tooling adaptor.

7. The clamping mechanism of claim 6 wherein the engaging zone is angled inwardly toward the longitudinal axis of the cylindrical member whereby the tooling adaptor is drawn into the eccentric slot as the retention knob moves from the loading zone into the engaging zone.

8. The clamping mechanism of claim 7 wherein the inward angle is up to about 20°.

9. The clamping mechanism of claim 8 wherein the inward angle is from about 2° to about 6°.

10. The clamping mechanism of claim 9 wherein the inward angle is about 4°.

11. The clamping mechanism of claim 7 wherein said inward angle is constant throughout the engaging zone of the cylindrical member.

12. The clamping mechanism of claim 2 further comprising means for preventing rotation of the cylindrical member in the first bore of the tool clamp block.

13. The clamping mechanism of claim 12 wherein the rotation preventing means comprises a second slot on the surface of cylindrical member opposed to said eccentric slot and in the direction of the said longitudinal axis and a projection on the surface of the first bore adapted to enter said second slot.

14. The clamping mechanism of claim 2 wherein the longitudinal axes of the first and second bores lie in a common plane.

* * * * *